(12) United States Patent
Cochran

(10) Patent No.: US 11,877,560 B2
(45) Date of Patent: *Jan. 23, 2024

(54) EQUIVEST: AN IMPROVED EQUINE ALL WEATHER PROTECTIVE GARMENT

(71) Applicant: Design Equine, LLC, Coatesville, PA (US)

(72) Inventor: James E. Cochran, Coatesville, PA (US)

(73) Assignee: Design Equine, LLC, Coatesville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,940

(22) Filed: Nov. 30, 2021

(65) Prior Publication Data

US 2022/0079117 A1    Mar. 17, 2022

Related U.S. Application Data

(63) Continuation-in-part of application No. 17/052,316, filed as application No. PCT/US2019/023898 on Mar. 25, 2019, now Pat. No. 11,582,951.

(60) Provisional application No. 62/666,186, filed on May 3, 2018.

(51) Int. Cl.
*A01K 13/00* (2006.01)

(52) U.S. Cl.
CPC .................................. *A01K 13/008* (2013.01)

(58) Field of Classification Search
CPC .................................................. A01K 13/008
See application file for complete search history.

(56) References Cited

U.S. PATENT DOCUMENTS

| | | | | |
|---|---|---|---|---|
| 1,612,945 A | * | 1/1927 | Rieck | A01K 13/006 |
| | | | | 54/79.2 |
| 3,248,852 A | * | 5/1966 | Schwartz | A01K 13/006 |
| | | | | 54/79.1 |
| D250,138 S | * | 10/1978 | Bartolac | A01K 13/006 |
| | | | | D30/145 |

(Continued)

FOREIGN PATENT DOCUMENTS

DE    20003525 U1 *  7/2000  ........... A01K 13/008

OTHER PUBLICATIONS

Translation of CA 2484576 A1; Horse Blanket; Morin Jac-Helene (Year: 2006).*

(Continued)

*Primary Examiner* — Monica L Perry
*Assistant Examiner* — Brittany A Lowery
(74) *Attorney, Agent, or Firm* — Joseph F. Aceto, Esq.

(57) ABSTRACT

Embodiments for an improved horse, livestock, and other guadruped's garment and method of use are disclosed. The EquiVest comprises a one-piece water-resistant vest having an open-oval-neckline with bib-tab design for slipping over the animal's head. Optionally, the garment includes hardware for attaching overlapping side panels. Coupled with the side panel attaching hardware, the bib-tab design provides side tabs with a hook-and-loop mechanism in a secure fit. The vest covers the top-line, both sides, abdominal area, center-front chest, and hind area to allow the horse to have complete ease of movement while maintaining a stable core body temperature.

14 Claims, 7 Drawing Sheets

(56) References Cited

U.S. PATENT DOCUMENTS

| | | | | |
|---|---|---|---|---|
| 4,955,182 | A * | 9/1990 | Newman | A01K 13/008 54/66 |
| 5,060,458 | A * | 10/1991 | Curtis | A01K 13/006 54/79.2 |
| 5,161,352 | A * | 11/1992 | Schneider | A01K 13/006 54/79.2 |
| 5,271,211 | A * | 12/1993 | Newman | A01K 13/008 54/79.2 |
| 5,361,563 | A * | 11/1994 | Llamas | A01K 13/008 54/79.2 |
| 5,839,395 | A * | 11/1998 | Kelley | A01K 13/008 54/79.2 |
| D427,734 | S * | 7/2000 | Balzarini | A01K 13/006 D30/145 |
| 6,481,383 | B1 * | 11/2002 | Ross | A01K 13/006 2/456 |
| 6,584,939 | B1 * | 7/2003 | Brezinski | A01K 13/008 D30/145 |
| 7,581,514 | B2 * | 9/2009 | Bonfoey | A01K 13/006 119/850 |
| 10,798,919 | B2 * | 10/2020 | Heintz | A44B 13/0052 |
| 2005/0039702 | A1 * | 2/2005 | Laffoon | A01K 27/00 119/850 |
| 2005/0126134 | A1 * | 6/2005 | Hathcock | A01K 13/008 54/79.2 |
| 2007/0204808 | A1 * | 9/2007 | Harada | A01K 13/006 119/850 |
| 2008/0110414 | A1 * | 5/2008 | Buehner | A01K 13/006 54/66 |
| 2009/0308330 | A1 * | 12/2009 | Kajanoff | A01K 13/006 119/850 |
| 2010/0050958 | A1 * | 3/2010 | Jackson | A01K 13/006 119/850 |
| 2013/0263561 | A1 * | 10/2013 | Caston | A01K 13/008 54/79.2 |
| 2014/0331943 | A1 * | 11/2014 | Roberson | A01K 13/006 119/758 |
| 2019/0297845 | A1 * | 10/2019 | Gilbert | A01K 13/008 |

OTHER PUBLICATIONS

Translation of EP 2324706 A1;Horse Blanket; Van Riel Antonius; (Year: 2011).*

* cited by examiner

Figure 1
Panel A
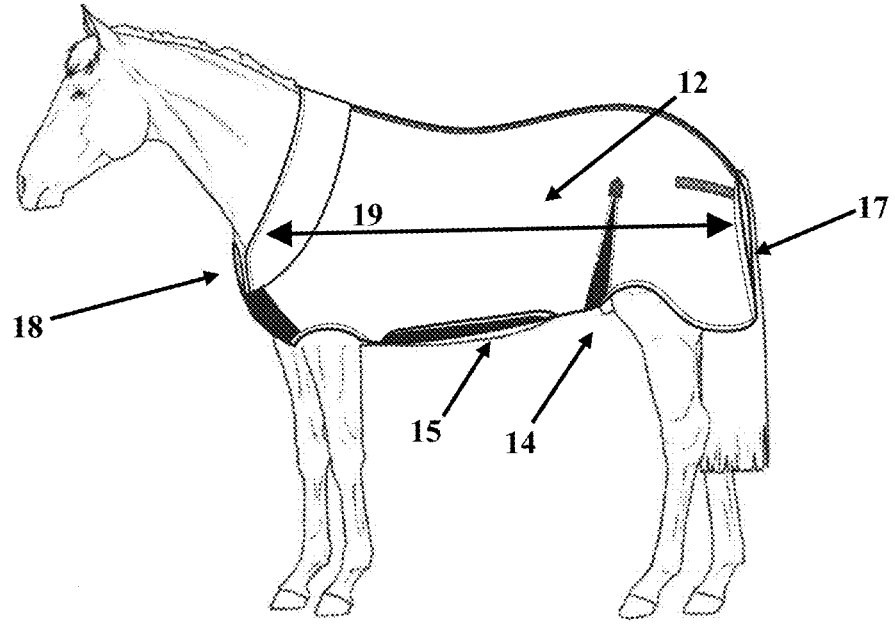
Panel B
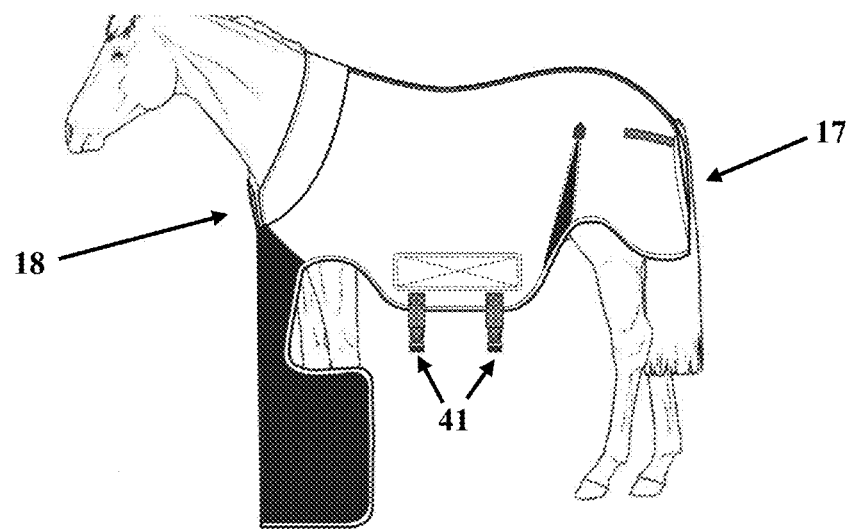

Figure 4, Panel A
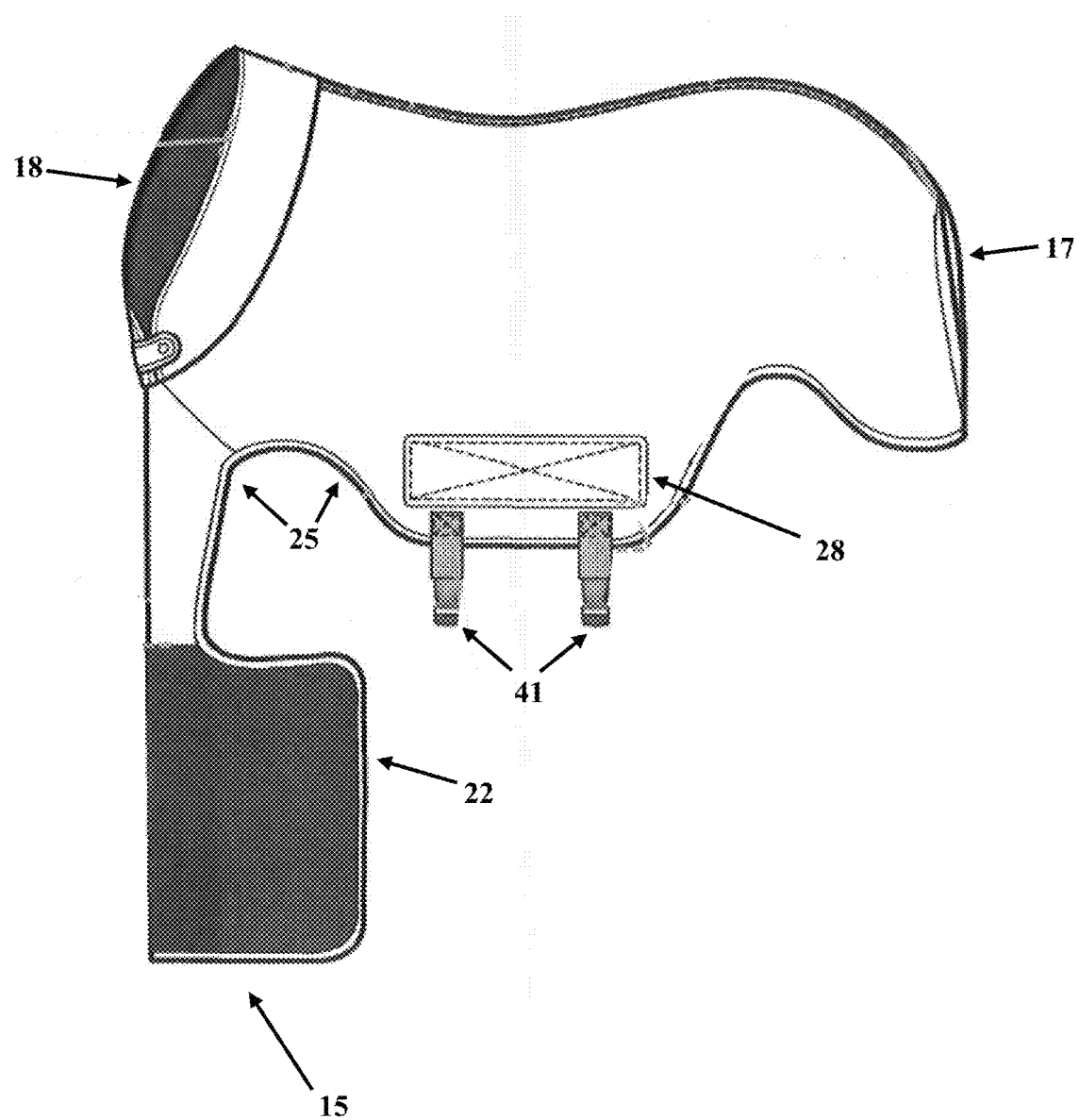

Figure 4, Panel B
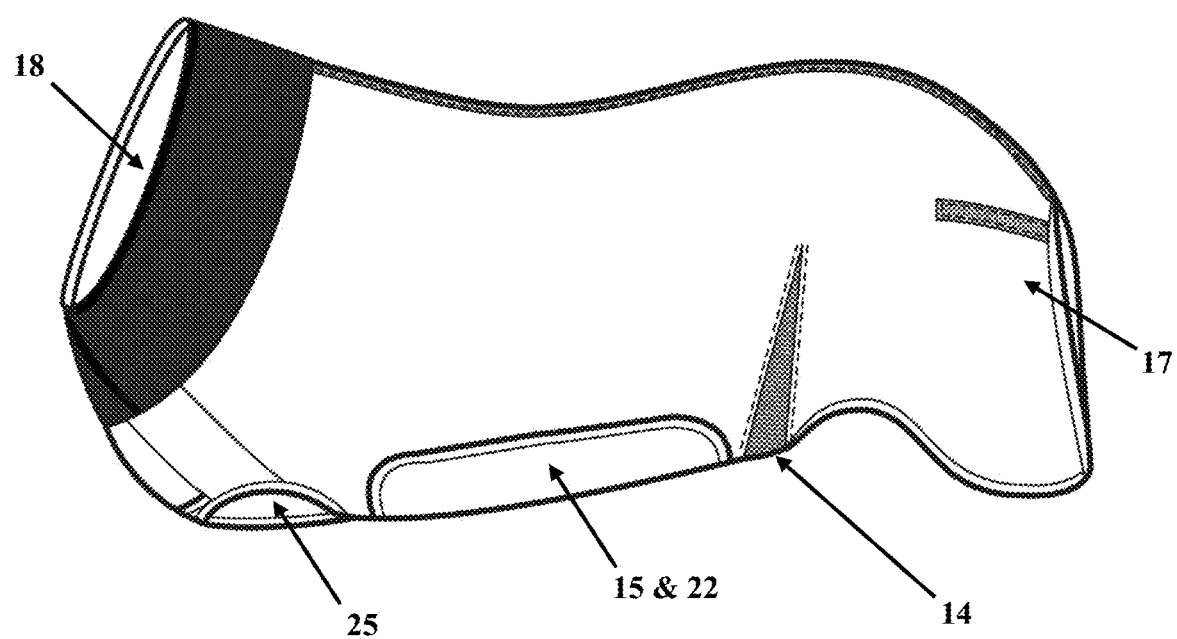

Figure 5
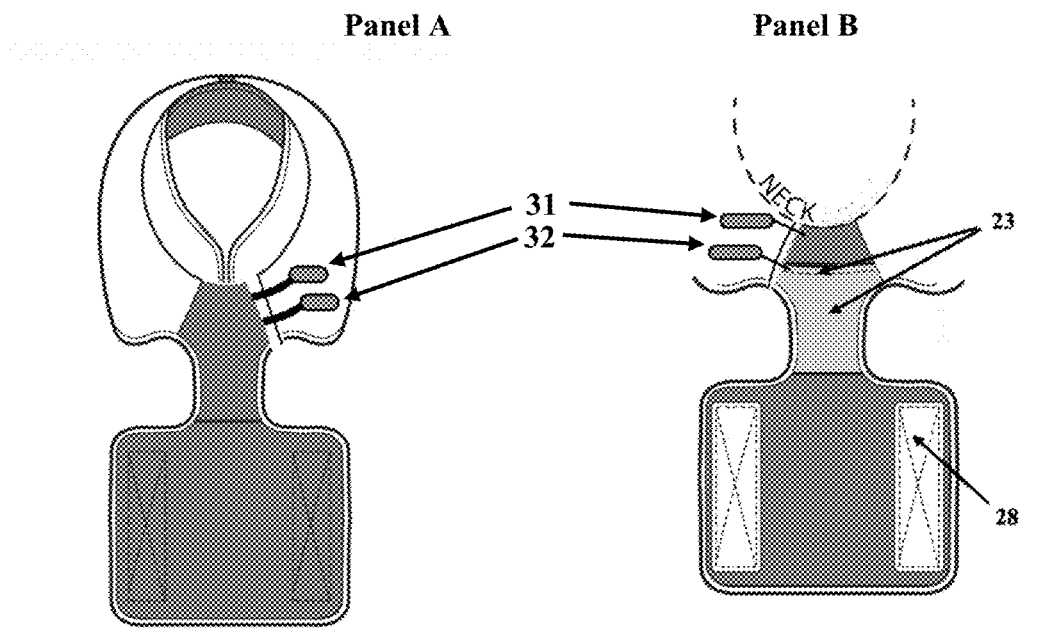
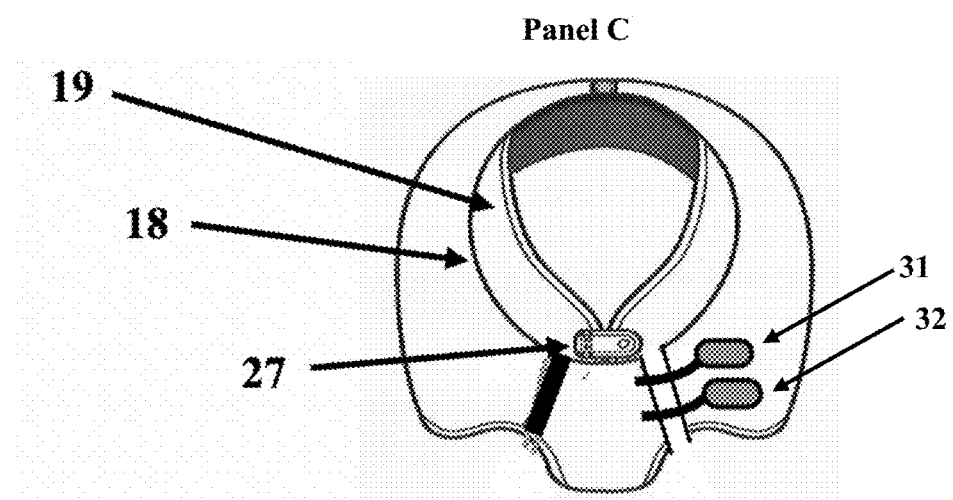

EQUIVEST: AN IMPROVED EQUINE ALL WEATHER PROTECTIVE GARMENT

CROSS REFERENCE TO RELATED APPLICATIONS

This application is a continuation-in-part of U.S. Ser. No. 17/052,316, filed on 2 Nov. 2020 which is the US national application of PCT/US2019/023898, filed on 25 Mar. 2019, now expired, which claims priority to U.S. Provisional Application No. 62/666,186, filed on 3 May 2018, now expired, the disclosures of which are herein incorporated by reference in its entirety.

FIELD OF THE INVENTION

This disclosure relates to a means for covering quadruped animals for protection from inclement weather conditions and warm weather biting insects. More particularly, the invention relates to a horse and livestock covering and method of use providing a new and easier means for attachment.

BACKGROUND OF THE INVENTION

The present disclosure relates generally to a protective covering for animals. In one embodiment, the present disclosure relates to a vest or jacket that slips over the animal's head through an open-oval-neckline in the garment secured with side release hardware, and a hook and loop closure. The center front bib-tab, goes between the front legs and fully encloses the chest and abdominal area. In particular, horses that live outdoors or in unheated barns or young, sick or thin horses that need to be shielded as much as possible from weather conditions would benefit from this garment. This is particularly important because horses are challenged to maintain a normal body temperature if their hair becomes wet and the conditions are cold and windy. Therefore, EquiVests, as defined in the present invention, are used as a means to protect the external surface and skin of the horse while providing immediate full torso and abdominal warmth.

Current blankets previously described are conventionally shaped as generally rectangular or blankets that are draped over the back of the animal, and then secured to the animal using various, buckles straps, extensions or hoods. For example, U.S. Pat. No. 5,361,563 discloses a blanket having a belly wrap that extends across the underside of the blanket, and a front flap that is secured to the blanket using a girth strap. Such a belly wrap, however, only pulls the blanket around the back and sides, leaving large amounts of abdominal and underside of the animal exposed. Additionally, the front flap is a narrow strip that leaves much of the chest exposed, while also requiring connection of multiple straps and fasteners. Similarly, U.S. Pat. No. 6,877,300 and U.S. Pub. No. 2008/0216454 disclose blankets that require straps to attempt to pull the side portions of the blanket towards the middle of the belly of the animal, leaving much of the belly exposed and requiring intricate positioning and tensioning of multiple straps. These and other garments, such as that described in U.S. Pat. No. 6,786,028, leave much or all of the chest and abdominal regions exposed, while requiring elaborate fastening systems. In addition, all of the current blanket straps tear off and can cause legs to be trapped and/or injured, tearing both fabric and straps. There is, therefore, a need for a more effective animal vest or jacket that is easy to use and set up providing for full weather and insect protection from the garment.

A need exists for a lightweight, horse covering which is easily placed on and taken off the horse, minimizes any rubbing and friction which takes place between the covering and the horse's coat, which can be worn in warm and cold weather, and will protect the horse from wind, rain, cold, snow, warm weather biting insects, or abdominal dirt. A need particularly exists for such coverings which will cover the horse's chest, shoulders, full barrel, and hind area.

SUMMARY OF THE INVENTION

The present invention has overcome deficiencies of the earlier art by providing a type of animal garment, an EquiVest, having a one-piece design providing water, weather and insect resistance, or protection from abdominal dirt. EquiVest does not drape over the animal and does not use straps and metal buckles with under belly and leg straps as described in prior animal blankets but is a one-piece, full body, bib design that slips over the animal's head through an open-oval neckline. The length varies from approximately 30 to 80 inches measured from front chest center to center tail flap. The width across the heart girth varies from approximately 20 inches to 64 inches. These dimensions provide approximately 15 different marketable sizes that will fit most horses, ponies and foals.

The EquiVest protects against inclement rain, snow and cold weather conditions including transporting and in stables. It also acts as a shield against flying and biting insects in warm weather seasons and in helping keep underbelly cleaner. The present invention offers the horse owner an easy-to-use, cost-effective, mid-weight, horse garment for protecting their animal in year-round, all season conditions.

BRIEF DESCRIPTION OF THE DRAWINGS

FIG. 1: Shown is a side view of an embodiment of the inventive one-piece horse garment positioned on a horse. Panel A shows a side view of the garment secured to the horse. Panel B shows a side view of the garment after positioning over the neck but prior to securing.

FIG. 4: Views of EquiVest in unsecured and secured positions. Panel A depicts a side view of the garment prior to securing, showing the two belly fasteners, and front tab prior to securing. Panel B shows the same garment secured when properly fastened to the horse.

FIG. 5: Depicts a drawing of a front view with a Bib-tab embodiment showing the oval neckline secured on the horse left side panel with bib buckles secured after placement around the animal's neck and head. Panel A is an outside front view of the Bib-tab with a collar as seen when secured to the horse with the bib buckles. Panel B is an inside perspective of the Bib-tab unsecured to the horse showing the pocket bag for the Bib-tab when stored. Panel C is a front view of the oval neckline with the Bib-tabs secured.

DESCRIPTION OF THE PREFERRED EMBODIMENTS

Figure 2:
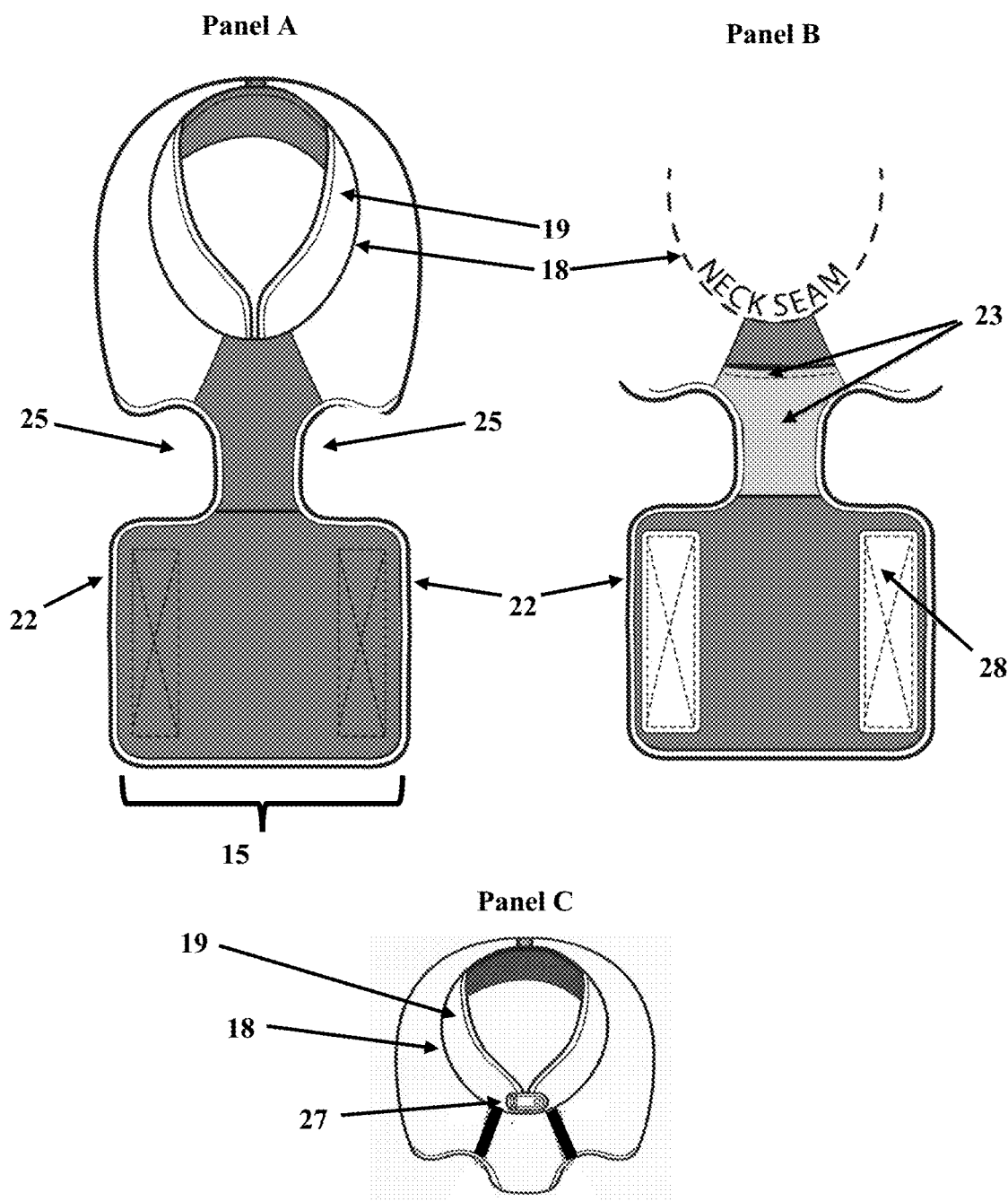
FIG. 2: Front view of the EquiVest Bib-tab showing the oval neckline for placement over the animal's head. Panel A is an outside view of the Bib-tab as seen unsecured to the horse. Panel B is an inside view of the Bib-tab unsecured to the horse showing the pocket bag for Bib-tab when stored. Panel C is a front view of the oval neckline with the Bib-tabs secured.

The figures and descriptions of the present invention are presented in a simplified format to illustrate elements that are relevant for a clear understanding of the present invention. Those of ordinary skill in the art will recognize that other elements may be desirable and/or required in order to implement the present invention. Because such elements are well known in the art and because they do not facilitate a better understanding of the present invention, a discussion of such elements is not provided herein. It should also be understood that the drawings included herewith only provide diagrammatic representations of the presently preferred structures of the invention and that other structures falling within the scope of the present invention may include structures different than those shown in the drawings.

FIG. 1 is a representative side view of the horse wearing the EquiVest having the main, one-piece section (12) in secured and in position on the horse. When in place, the garment is held securely on the body or torso of the horse with four positioned and shaped leg openings for more comfortable walking or grazing movement by the horse. One embodiment of the present invention incorporates a quilted nylon body fabric, incorporating two hind gussets (14) located in front of the hind legs and before the perimeter of each opening for the limbs, providing a close comfortable fit and flex in the garment during movement of hind quarters. A one-piece bib-tab portion (15) is first placed over the horse's neck and positioned (Panel B). The garment is then secured to the lower torso or underbelly of the horse (Panel A) by first attaching the garment's under belly using side release hardware (41) and then attaching each side body panel (22) with a hook and loop mechanism (28) such as Velcro®, a snap closing or any means known in the art. An overlapped tail flap design (17) protects the rear portion of the animal and the base of the tail.

The garment covers top-line, both sides, center-front chest, and the top 35% of the rear legs of the animal, in addition to the back hips, rump and top 25% of the tail. The length (19) varies from approximately 30 to 80 inches measured from front chest center to tail flap (17). The width across the heart girth varies from approximately 20 inches to 64 inches. These dimensions provide approximately 15 different marketable sizes that will fit most horses, ponies and foals.

In order to attach the Equivest garment to the horse, the garment is first slipped over the animal's head through a front open oval neckline (18) then positioned on top of the torso. By slipping the animal's head through the front open oval neckline (18) as described herein, the animal remains relaxed with minimal stress and the garment is quickly and easily secured. A front view of the garment is shown in FIG. 2, Panel A and Panel B. The front open oval neckline (18) is defined by a collar (19). FIG. 2, Panel A represents an outer front view of the garment prior to securing the center-front Bib-tab portion (15). In the outside view of Panel A, the center-front Bib-tab portion (15), containing the securing Velcro side tabs (28) is shown. The Bib-tabs are pulled back and through the front legs which allow the Bib-tabs (22) to secure onto the underside of the garment (28) preferably using a hook-and-loop fastener (Velcro™, Velcro Industries B.V., The Netherlands), but also a heavy-duty hook-and-loop fastener such as a Dual Lock® (3M Company Corporation, MN) having rectangular fabric on each face of the fastener or similar means known in the art is considered. Panel B is an inside view of the Bib-tab that shows the hook-and-loop fastener region (28) on the inner surface of the Bib-tab. The hook-and-loop fastener, such as a heavy-duty hook-and-loop fastener, may alone provide the secured attaching means for entire garment to support movement by the horse. However, each under belly region has two, 2-inch, side-release hardware (41) such as, but not limited to, D-rings with accompanying clips or 2 plastic safety male/female compression clips (parachute chord buckles), on each side body panel to first secure sides under belly to provide added security. Any suitable securing means in the art is considered that will function as a supplemental closure device and insure that the hook-and-loop fasteners on the side tabs (22) remain fully fastened with the garment remaining correctly positioned on the animal. Panel B further depicts a pocket bag attachment (23) for the folded bib-tab storage when the garment is not in use and stored. When stored in the pocket bag (23), the bib-tabs on both sides are folded inward and then upward to form a square shape at a size that fits into the pocket for storage and ease of handling. FIG. 2, Panel C further depicts a front view of the garment having the center-front bib-tab secured in its proper position during use. Also shown is an optional further securing clip (27) on the collar (19) to allow for a close-fitting and snug perimeter around the horse's neck. FIG. 2, Panel C further depicts one embodiment for the collar where the outside portion of the collar has the same fabric as the body of the garment and a further mesh liner within the inner portion.

Figure 3:
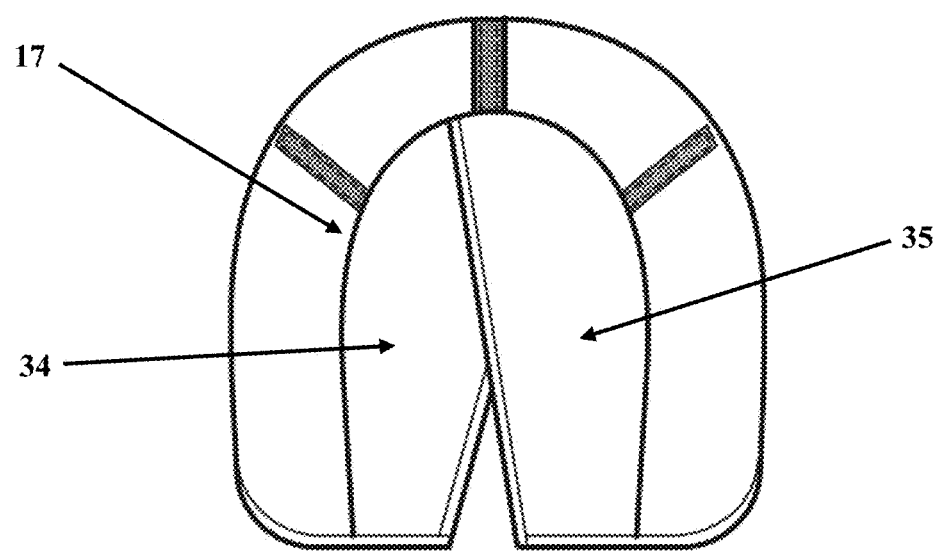
FIG. 3: Rear view of the EquiVest showing the relationship of the tail-flaps for better protecting the tail and posterior region.

FIG. 3, Shows overlapping curved tail flaps (34) and (35), considered in the present invention to provide a more complete protection from weather conditions and biting insects while still allowing the animal to easily raise and lower tail or use a swishing movement. Shown as a rear view of the tail flap region (17) in FIG. 3, the flaps are oriented in a slightly overlapping format over the tail when the animal has relaxed the tail. When the tail is flexed, the flaps easily separate and provide for free and open tail movement which then returns to the overlap position when the tail is again relaxed.

FIG. 4, Panel A shows a side view of the garment prior to securing. In one embodiment, the center-front bib-tab portion (15) with the two side tabs (22) is pulled through the front legs and the side tabs (22) are attached to the corresponding hook-and-loop fastener fixed on the torso portion (28) of the garment. The hook-and-loop fastener can function as one means of attachment, especially when utilizing a heavy-duty hook-and-loop fastener, but further securing with two body side release hardware (41) such as D-rings or other securing means. FIG. 4, Panel B depicts the same garment when properly attached to the horse (horse image not shown). A further embodiment of the present invention and shown in FIG. 4, Panel B incorporates a gusset (14) at the hip to allow normal rear leg movement during walking or grazing and provide proper range of motion of the hind limb and its articulation with the pelvis.

When secured in position, the front and back leg areas of the EquiVest garment has curved shaped leg openings (25) on the left and right sides, making the animal's movement easier and providing more comfort than prior standard horse garments.

Each garment can be produced in any fabric or weight or color known in the art and in any combination thereof. Each garment is tailored for specific sizes. One embodiment incorporates a quilted fabric. A preferred embodiment is 200 to 1200 weight nylon or polyester fabric and can be quilted nylon or polyester denier. Insulated and non-insulated versions are also considered.

Figure 6:
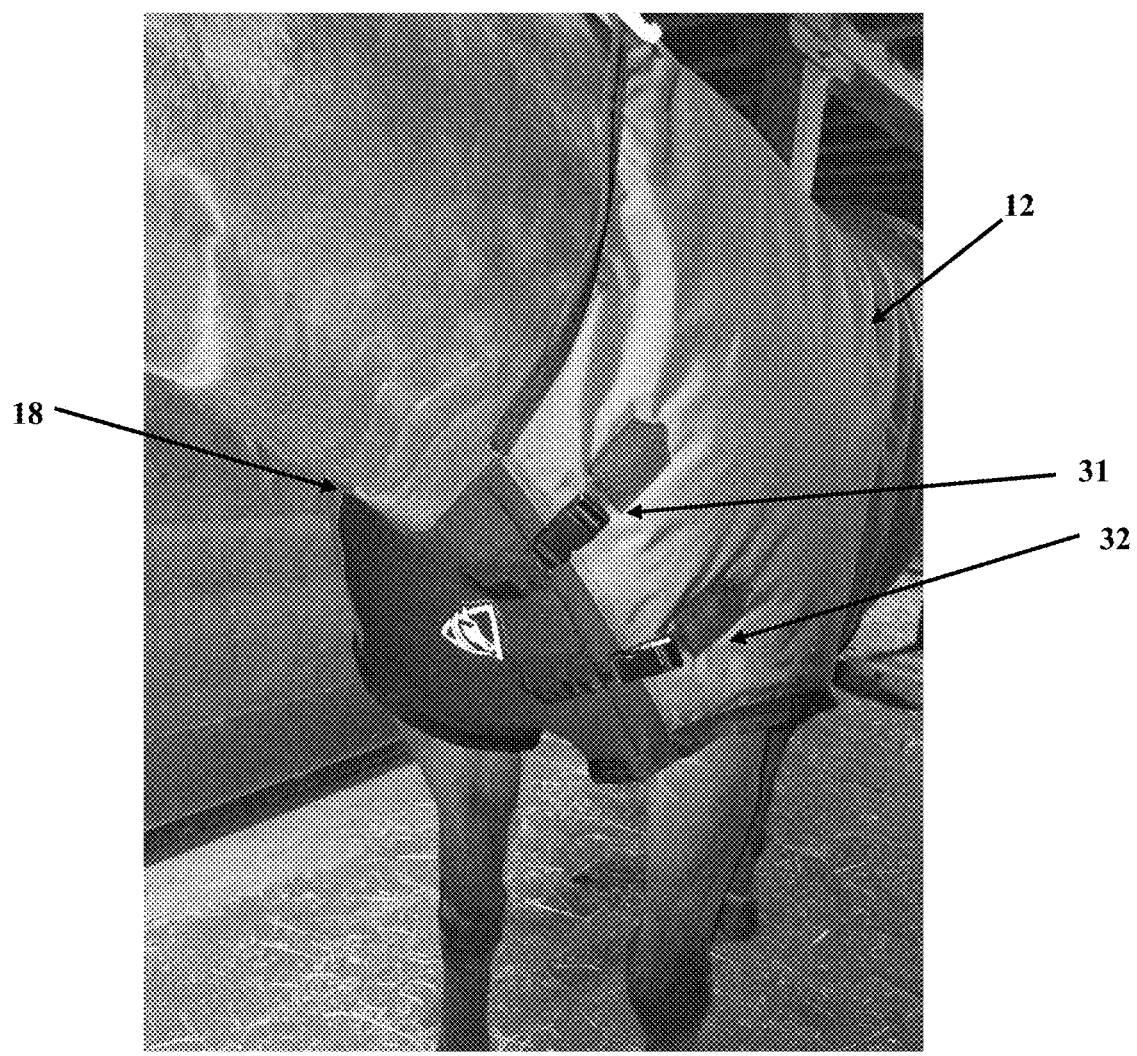
FIG. 6: Depicts an image of a center-front section of a horse having the garment secured in position with a center-front bib portion stitched and fixed on the horse's right side of center-front and the open opposite left side secured using two buckles with straps.

FIG. 5 depicts a still further improvement to the center-front bib portion with the extended tab portion having the center-front bib open along the seam with a dual buckle mechanism or two buckle chest portion on one side of the main one-piece section. Figure Panel A depicts outside front view of the Bib-tab with a collar secured with bib buckles (31) and (32) to the left side of the horse body. The center-front bib buckles allow positioning the bib center-front which is further shown as an in-side view from the neck in FIG. 5 Panel B, securing an inside portion of the open oval neckline (18). FIG. 5 Panel C depicts a direct front garment view of the region when secured with the buckles. The side of the center-front bib when secured using the left two buckles and straps (31) and (32) in FIG. 6 allows further complete positioning of the garment between the two front legs. The complete underside belly region of the garment's bib-tab (28) is then secured to the main section (12) through side release hardware (41) as previously shown.

The improved embodiment allows rapid attachment to all types of horses, especially larger horses, making attachment by only a small individual much easier and simpler. Consequently, a small person is able to easily approach a horse from the animal's left side and quickly cover the back of the horse with the open bib-tab and main one-piece section (12) of the horse using a single throw and then secure the center-front bib into position around the horse using bib buckles (31 and (32). The improved design is more easily manufactured and significantly reduces the cost of producing the garment.

The improvement further allows the garment to be secured while the horse is positioned in a horse halter or is secured with cross ties. Consequently, when the horse is attached in a barn or stall, the garment is easily attached and secured in a confined or small space without removing the up rings or quick release hooks on the ties.

The present invention provides a more secure and effective fit with little or no stress to the animal. EquiVest provides an improved method for easier covering and securing of a cold, mild or warm weather horse garment and increasing the efficiency by not requiring the utilization of traditional separate elastic belly, leg and/or tail straps.

Those of ordinary skill in the art will recognize that various modification and variation may be made to the embodiments described above without departing from the spirit and scope of the present invention.

I claim:

1. A one-piece garment for a horse comprising:
   a. a unitary body portion positioned along the center line of a horse;
   b. a center-front chest bib having a bottom tab which forms a front open oval neckline secured by a seam on the right side of a main one-piece section;
   c. a two buckle attachment along the left center-front chest bib for securing to the unitary body portion;
   d. four positioned openings created for each leg when the tab and two main one-piece sections to the under belly of the horse are secured and allow leg movement during walking or grazing: and
   e. overlapping tail flaps sewn onto the unitary body, wherein any movement of the tail causes the flaps to articulate independent from the unitary body, wherein securing on a horse forms a one-piece garment.

2. The one-piece garment of claim 1 wherein engaging the two buckle attachment forms a front open oval neckline collar.

3. The one-piece garment of claim 2 wherein the collar is mesh or polyester fabric.

4. The one-piece garment of claim 2 wherein the collar has a fabric outer portion and a mesh inner portion.

5. The one-piece garment of claim 2 wherein a front open oval neckline has a securing clip to allow close-fitting around collar on the horse's neck.

6. The one-piece garment of claim 1 wherein a hook-and-loop fastener is used for each buckle.

7. The one-piece garment of claim 1 having side release hardware on the under-belly to secure the garment.

8. The one-piece garment of claim 7 having side release hardware selected from a group consisting of D-rings with accompanying clips, plastic safety male/female compression clips, parachute chord buckles and combinations thereof.

9. The one-piece garment of claim 1 having quilted or non-quilted fabric.

10. The one-piece garment of claim 1 having approximately 200 to 1200 weight nylon or polyester denier.

11. The one-piece garment of claim 1 having a length of approximately 30 to 80 inches and a width across a heart girth from approximately 20 inches to 64 inches.

12. The one-piece garment of claim 1 further having polyester insulation.

13. The one-piece garment of claim 1 further having flexible gussets at the hips to allow a hind limb to have proper range of motion during walking or grazing.

14. A method for an individual to cover a horse with a one-piece garment comprising:
    a. approaching the longitudinal belly portion of the left side of a horse;
    b. holding a one-piece garment of claim 1 having a unitary body portion positioned along the center line of the horse and front-center bib with a first and second disconnected under-belly buckles and left front-center-bib buckles;
    c. throwing the open one-piece garment over the back portion of the horse in a single complete motion;
    d. securing the front-center bib portion left side buckles to position a bib-tab section under the belly; and
    e. attaching the bib-tab and unitary body portion with first and second under-belly buckles wherein the one-piece garment covers the body of the horse having overlapping tail flaps sewn onto the unitary body which causes the flaps to articulate independently with any movement.

* * * * *